(12) United States Patent
Shi

(10) Patent No.: US 10,817,698 B2
(45) Date of Patent: Oct. 27, 2020

(54) TOUCH DISPLAY PANEL WITH FINGERPRINT RECOGNITION DEVICE

(71) Applicant: WUHAN CHINA STAR OPTOELECTRONICS TECHNOLOGY CO., LTD., Wuhan, Hubei (CN)

(72) Inventor: Tengteng Shi, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/310,218

(22) PCT Filed: Oct. 9, 2018

(86) PCT No.: PCT/CN2018/109444
§ 371 (c)(1),
(2) Date: Dec. 14, 2018

(87) PCT Pub. No.: WO2020/042283
PCT Pub. Date: Mar. 5, 2020

(65) Prior Publication Data
US 2020/0074136 A1 Mar. 5, 2020

(30) Foreign Application Priority Data
Aug. 29, 2018 (CN) .......................... 2018 1 0995923

(51) Int. Cl.
*G06K 9/00* (2006.01)
*G06F 3/041* (2006.01)
*G02F 1/1333* (2006.01)
*G06F 21/32* (2013.01)

(52) U.S. Cl.
CPC ....... *G06K 9/0004* (2013.01); *G02F 1/13338* (2013.01); *G06F 3/0412* (2013.01); *G06F 21/32* (2013.01)

(58) Field of Classification Search
CPC . G06K 9/0004; G02F 1/13338; G06F 3/0412; G06F 21/32
See application file for complete search history.

(56) References Cited

U.S. PATENT DOCUMENTS

| 2016/0132176 | A1* | 5/2016 | Bae | G06F 3/0416 345/174 |
|---|---|---|---|---|
| 2017/0351850 | A1* | 12/2017 | Jin | H01L 24/46 |
| 2019/0079628 | A1* | 3/2019 | Liu | G06F 3/0414 |
| 2019/0080137 | A1* | 3/2019 | Wu | H01L 27/3227 |

* cited by examiner

*Primary Examiner* — Mark W Regn
(74) *Attorney, Agent, or Firm* — Muncy, Geissler, Olds & Lowe, P.C.

(57) ABSTRACT

A touch display panel with a fingerprint recognition device is provided. The touch display panel is a liquid crystal display panel, the liquid crystal display panel includes a fingerprint sensing unit and a control circuit integrated in a thin film transistor layer of the liquid crystal display panel. The fingerprint sensing unit is configured to collect a light entering the touch display panel, and convert the collected light into electrical signals. The light is a reflected light generated from a screen light source blocked by a fingerprint. The control circuit is configured to generate a fingerprint image.

3 Claims, 3 Drawing Sheets

TOUCH DISPLAY PANEL WITH FINGERPRINT RECOGNITION DEVICE

FIELD OF INVENTION

The present invention relates to fields of touch display panel technologies, especially to a touch display panel with a fingerprint recognition device.

BACKGROUND OF INVENTION

With the popularity and development of mobile payment, fingerprint recognition has gradually become an important method for password verification in mobile payment. Therefore, for conventional mobile apparatuses, especially for mobile phones, fingerprint recognition devices are indispensable and irreplaceable component. How to set the location of the fingerprint recognition device on a terminal to further improve the convenience of use and optimize the user experience has become one of the important issues to consider when designing mobile phones.

Technical Issues

Currently, most mobile apparatuses dispose a fingerprint recognition device in a non-displaying region of the mobile apparatus, for example, a rear of a display panel, or a non-displaying region above a display panel. It is apparent that integrating fingerprint recognition into the displaying region further optimizes user experience. However, it is difficult to achieve because of following shortages existing in conventional technologies.

1. Wires of a sensor panel of fingerprint recognition cannot extend and connect between a touch sensor and a controller.
2. A fingerprint recognition sensor increases workload of the touch sensor, which affects touching functions.
3. The fingerprint recognition sensor has high process requirement, and process of the current touch sensor cannot achieve the requirement.
4. The addition of the fingerprint sensor will reduce transmittance of the display and the display.

SUMMARY OF INVENTION

To solve the above technical issues, the present invention provides a fingerprint recognition device and a touch display panel with the fingerprint recognition device, configured to integrate a fingerprint recognition region under a displaying region of the touch display panel without additional an individual fingerprint recognition module, which increases integration of the device and solve the above issue fundamentally.

Specifically, the technical solutions provided by the present invention are as follows.

A touch display panel with a fingerprint recognition device has the touch display panel being a liquid crystal display panel, and the liquid crystal display panel comprises a fingerprint sensing unit and a control circuit that are integrated in a thin film transistor layer of the liquid crystal display panel;

wherein the fingerprint sensing unit is configured to collect light entering the touch display panel and convert the collected light into electrical signals; the light is a reflected light generated from a screen light source blocked by a fingerprint;

wherein the control circuit is configured to, based on a matching algorithm, convert the electrical signals generated by the fingerprint sensing unit into image signals to generate a fingerprint image;

wherein the fingerprint sensing unit comprises a photosensitive material layer, the photosensitive material layer is configured to recognize light reflected from a fingerprint valley region and light reflected from a fingerprint ridge region and convert the lights into different current signals;

wherein the liquid crystal display panel further comprises a light concentrating unit integrated in the thin film transistor layer of the liquid crystal display panel, the light concentrating unit is located above the fingerprint sensing unit, and is configured to converge and enhance light entering the touch display panel.

According to one of the embodiments of the present invention, a color filter array of the liquid crystal display panel comprises red pixel units, green pixel units, blue pixel units and transparent pixel units, and a shape and an area of each of the transparent pixel units are the same as a shape and an area of each of the red pixel units, the green pixel units or the blue pixel units.

According to one of the embodiments of the present invention, projections of the transparent pixel units of the color filter array along a direction perpendicular to the display panel at least partially overlap the fingerprint sensing unit.

According to one of the embodiments of the present invention, projections of the transparent pixel units of the color filter array along a direction perpendicular to the display panel fully cover the fingerprint sensing unit, and an area of the projections is at least twice an area of the fingerprint sensing unit.

A touch display panel with a fingerprint recognition device is provided, wherein the touch display panel is a liquid crystal display panel, and the liquid crystal display panel comprises a fingerprint sensing unit and a control circuit that are integrated in a thin film transistor layer of the liquid crystal display panel;

wherein the fingerprint sensing unit is configured to collect light entering the touch display panel and convert the collected light into electrical signals; the light is a reflected light generated from a screen light source blocked by a fingerprint;

wherein the control circuit is configured to, based on a matching algorithm, convert the electrical signals generated by the fingerprint sensing unit into image signals to generate a fingerprint image.

According to one of the embodiments of the present invention, a color filter array of the liquid crystal display panel comprises red pixel units, green pixel units, blue pixel units and transparent pixel units, and a shape and an area of each of the transparent pixel units are the same as a shape and an area of each of the red pixel units, the green pixel units or the blue pixel units.

According to one of the embodiments of the present invention, projections of the transparent pixel units of the color filter array along a direction perpendicular to the display panel at least partially overlap the fingerprint sensing unit.

According to one of the embodiments of the present invention, projections of the transparent pixel units of the color filter array along a direction perpendicular to the display panel fully cover the fingerprint sensing unit, and an area of the projections is at least twice an area of the fingerprint sensing unit.

According to one of the embodiments of the present invention, the fingerprint sensing unit comprises a photosensitive material layer, the photosensitive material layer is configured to recognize light reflected from a fingerprint valley region and light reflected from a fingerprint ridge region and convert the lights into different current signals.

According to one of the embodiments of the present invention, the liquid crystal display panel further comprises a light concentrating unit integrated in the thin film transistor layer of the liquid crystal display panel, the light concentrating unit is located above the fingerprint sensing unit, and is configured to converge and enhance light entering the touch display panel.

Accordingly, the present invention also provides a touch display panel with a fingerprint recognition device, wherein the touch display panel is an organic self-luminescence display panel, the organic self-luminescence display panel comprises an upper-layer electrode, a self-luminescence layer, a lower-layer electrode, and a fingerprint sensing unit and a control circuit fitted under the lower-layer electrode;

wherein the fingerprint sensing unit is configured to collect light entering the touch display panel and convert the collected light into electrical signals; the light is a reflected light generated from a screen light source blocked by a fingerprint;

wherein the control circuit is configured to, based on a matching algorithm, convert the electrical signals generated by the fingerprint sensing unit into image signals to generate a fingerprint image.

According to one of the embodiments of the present invention, the self-luminescence layer of the organic self-luminescence display panel comprises a color filter array, the color filter array comprises red pixel units, green pixel units and blue pixel units, and a distance between adjacent two of the red pixel units, the green pixel units and the blue pixel units is equal to or less than 10 μm.

According to one of the embodiments of the present invention, a projection of an interval between adjacent two of the red pixel units, the green pixel units and the blue pixel units of the color filter array along a direction perpendicular to the display panel is located at a geometric center of the fingerprint sensing unit.

According to one of the embodiments of the present invention, the touch display panel further comprises a light concentrating unit located between the lower-layer electrode and the fingerprint sensing unit configured to converge and enhance light entering the touch display panel.

Advantages

Advantages of the present invention are as follows. Compared to a conventional method of utilizing an individual fingerprint recognition module, the present invention integrates the fingerprint recognition device into the thin film transistor layer under the liquid crystal layer of the touch display panel and is able to achieve connection of the fingerprint recognition device to a controller without additional wires, which significantly improves integration, decreases manufacturing processes, and lowers manufacturing and designing cost. Compared to a conventional pressure sensing fingerprint recognition device, the fingerprint recognition device of the present invention achieves fingerprint recognition by a photosensitive module without employing additional sensing load, and prevents negative effect to touching functions. Furthermore, the present invention integrating the fingerprint recognition device into the transistor layer under the liquid crystal layer is a very mature technology in the art, and has simple processes and low cost. Therefore, the fingerprint recognition device of the present invention can be massively produced on a large scale based on existing processes, which achieves the goal of integrating the fingerprint recognition module into the displaying region of mobile apparatuses and extremely improves user's experience.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
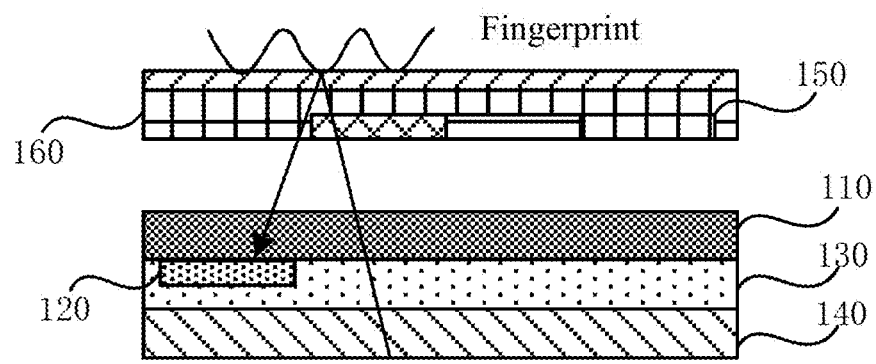
FIG. 1 is an illustrative structural schematic view of a fingerprint recognition device of an embodiment of the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference numerals.

The terminology used herein is only for the purpose of describing the particular embodiments instead of limiting exemplary embodiments. The singular forms "a", "an" also includes plural forms unless it is specified otherwise in the context. It is also to be understood that the terms "comprises" and/or "comprising", as used herein, are intended to mean the presence of the recited features, integers, steps, operations, units and/or components, and do not exclude the presence or addition of one or more other features, integers, steps, operations, units, components, and/or combinations thereof.

The embodiment of the present invention will be described in detail below with reference to the accompanying drawings.

The present invention provides a touch display panel with a fingerprint recognition device. The touch display panel is a liquid crystal display panel, and the liquid crystal display panel comprises a fingerprint sensing unit and a control circuit that are integrated in a thin film transistor layer of the liquid crystal display panel. The fingerprint sensing unit is configured to collect light entering the touch display panel and convert the collected light into electrical signals; the light is a reflected light generated from a screen light source blocked by a fingerprint. The control circuit is configured to, based on a matching algorithm, convert the electrical signals generated by the fingerprint sensing unit into image signals to generate a fingerprint image.

With reference to FIG. 1, FIG. 1 shows an illustrative structural schematic view of a touch display panel with a fingerprint recognition device of an embodiment of the present invention. The fingerprint recognition device is located under a displaying region of the touch display panel. Specifically, the fingerprint sensing unit comprises a light concentrating module 110 and a sensing module 120. The light concentrating module 110 is an optical lens, and is configured to converge and enhance light entering the fingerprint sensing unit. The sensing module 120 is a photosensitive material layer, and is configured to convert the enhanced light signals into electrical signals. Application of both the optical lens and the photosensitive material layer are very mature technologies in the field, and will not be described here.

Because the present invention entirely dismisses the method of pressure sensing fingerprint recognition, and achieves fingerprint recognition only by recognizing the reflection of the fingerprint on the in-screen light source without additional sensing load, which does not affect touching functions of the screen. Therefore, the fingerprint recognition device of the present invention overcomes limitation of area, and can be distributed on a part of the display panel, or alternatively can be distributed on the entire region below the display panel. The fingerprint recognition device, in application, can be arranged arbitrarily according to requirement of mobile apparatuses and software.

For instance, when the entire screen is set as a fingerprint recognition region, the fingerprint recognition function can be realized no matter where a user puts his/her finger on, which greatly optimizes the user's experience. Further, under a second condition, dual fingerprint password, multi-fingerprint password or even palm prints can be set, i.e., two or more fingerprints or palm prints of the user are recorded as a whole for recognition, which extremely improve safety of password compared to a single fingerprint.

Preferably, the fingerprint recognition device further comprises a control unit configured to activate the fingerprint recognition device when receiving a fingerprint recognition instruction, or otherwise deactivate the fingerprint recognition device. The control unit is able to make the fingerprint recognition device be activated only when fingerprint recognition is required, for example, the fingerprint recognition device is activated when a fingerprint or a password is to be recorded. Under a general condition for touch operation the fingerprint recognition device is deactivated, for example, when finger typing is implemented, when touch operations such as selection, the fingerprint recognition device is deactivated, which efficiently lowers system power consumption.

Figure 2:
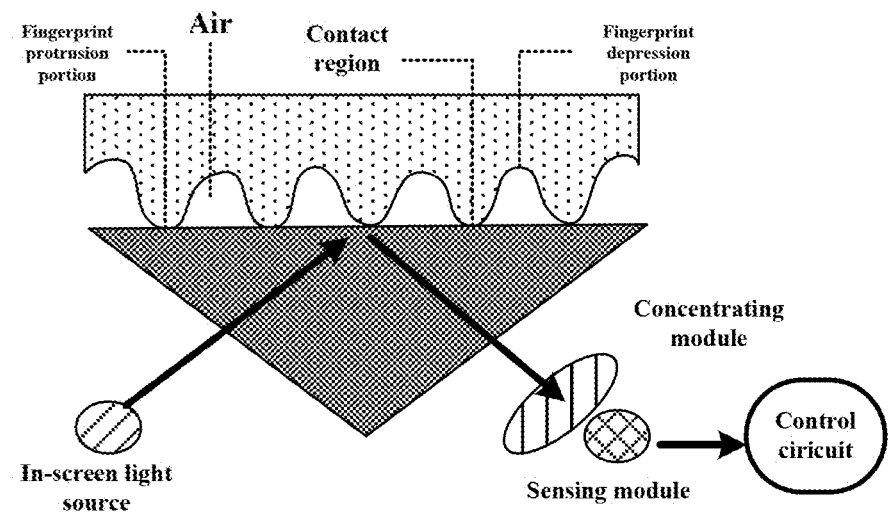
FIG. 2 is a principle diagram of a fingerprint recognition device of an embodiment of the present invention.

FIG. 2 shows a principle diagram of the fingerprint recognition device of the embodiment of the present invention. With reference to FIG. 2, at present, a displaying surface of the touch display panel is usually a specular material with extremely high light transmittance and has very strong reflection effect to the light. Because the intensity of an in-screen light source is extremely high, and a distance from the in-screen light source to the display panel is very short (less than 0.2 cm), therefore, the light of the light source can easily penetrate the display panel. A light source in the external environment is usually at a long distance (few meters or longer) far from the display panel, and therefore the light reaching the display panel becomes very weak and cannot penetrate the display panel but is reflected by the specular material instead. In other words, the external light source cannot reach below the display panel. On the contrary, the in-screen light source can directly penetrate the screen to reach the user's retina without block of the display panel.

When the user presses his/her finger against the display panel, because the light cannot penetrate a finger, most of the in-screen light will be reflected to the display panel. At the meantime, intensity of the reflected light is high, and distance between the reflected light and the screen is very short and therefore can be omitted. Therefore, the reflected light cannot easily extend through the screen and reach a pace underneath the screen, as shown in FIG. 2. The reflected light is collected and converted by the fingerprint sensing unit into electrical signals transferred the control unit later. Because a protrusion portion of the fingerprint and a valley portion of the fingerprint are different in shape, light reflection characteristics of the portions are also different, and therefore electrical signals generated by the fingerprint sensing unit corresponding to the portions are also different. The control circuit processes the different electrical signals to produce a fingerprint image, which achieves the fingerprint recognition. The implementation of the control circuit is a well-developed technology in the art, and those skilled in the art can easily construct a corresponding functional circuit according to the algorithm of the control circuit, and details thereof will not be described herein.

Preferably, in one embodiment of the present invention, the liquid crystal display panel comprises a color filter array 160. The color filter array 160 is composed of red, green, and blue pixels 150 arranged according to certain rules. The liquid crystal display panel further comprises a thin film transistor array 130 and a backlight light source 140. The light concentrating unit 110 is located above the thin film transistor array 130. The liquid crystal layer is located between the color filter array 160 and the light concentrating unit 110 (not shown). In the present embodiment, the fingerprint sensing unit and control circuit can be located in the thin film transistor array 130 of the liquid crystal display panel, and is integrated and incorporated into the control circuit of the liquid crystal display panel. Therefore, the present invention requires no additional wires to achieve the connection of the fingerprint recognition device to the controller, which significantly increases integration, reduces production processes, and decreases production and design costs.

Figure 3:
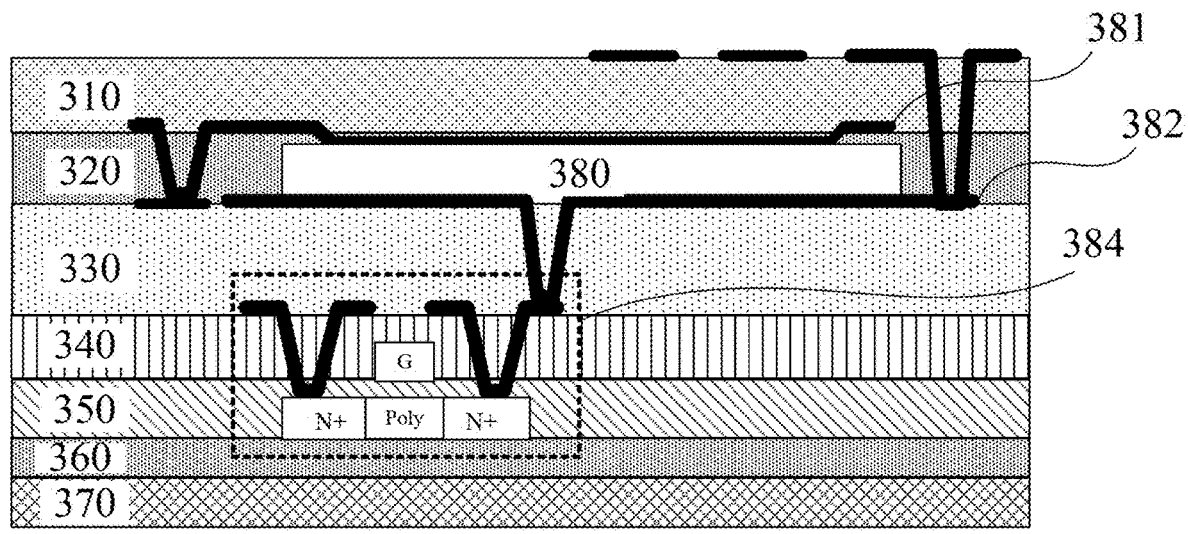
FIG. 3 is a specific structural schematic view of a fingerprint recognition device of an embodiment of the present invention.

The present invention will be further described with FIG. as follows. Specifically, FIG. 3 is a partially structural schematic view of a thin film transistor layer of a liquid crystal display panel with an integrated fingerprint recognition device of the present invention. Reference number 310 refers to a first insulating layer. In the present embodiment, the insulating layer 310 may be an insulating condenser lens, i.e., the light concentrating unit of the fingerprint recognition device, and can converge and enhance light entering the touch display panel. Reference number 320 refers to a second insulating layer that is configured to form an electrical isolation region on the sensing unit 380. The sensing unit 380 comprises photosensitive material layer, the photosensitive material layer can recognize light reflected by the fingerprint valley region and light reflected by the fingerprint ridge region, and converts the lights into different current signals. Reference number 381 refers to a metal electrode that is configured to provide the sensing unit 380 with a stable work voltage. The sensing unit 380 is a photosensitive material layer. The in-screen light, after reflected by the fingerprint back into an inside of the display panel, is converged by the condenser lens and irradiates the sensing unit 380. The sensing unit 380, excited by the irradiation of the light, generates current to form electrical signals, the electrical signals are transferred to the lower control circuit through the lower metal layer 382, and the control circuit by the received electrical signals proceeds and restores to realize fingerprint recognition.

The control circuit integrated in the thin film transistor layer will be further described as follows. As shown in FIG. 3, a MOS tube structure 384 is located under the metal layer 382. Region N+ refers to a source and drain region, region G refers to a gate electrode, region Poly refers to a channel region, reference number 330 refers to a flattened layer, reference number 340 refers to a interlayer dielectric layer, reference number 350I refers to an insulating layer, reference number 360 refers to a cushion layer, reference number 370 refers to a screen light source. The electrical signals in the sensing unit 380 is connected to the source and drain region of the MOS tube through the metal layer 382 to realize inputting of signals.

FIG. 3 only illustratively describes the structure of the fingerprint recognition device integrated in the thin film transistor, and actual arrangement of the transistors will be far more complicated and finer than that show in FIG. 3. The specific integration process is a mature technology in the art, and a person skilled in the art can design a specific circuit according to the requirements of the present invention, and details are not described herein.

Preferably, in the present embodiment, the color filter array of the liquid crystal display panel comprises red pixel units, green pixel units, blue pixel units and transparent pixel units. A shape and an area of each of the transparent pixel units are the same as a shape and an area of each of the red pixel units, the green pixel units or the blue pixel units. Furthermore, projections of the transparent pixel units in the color filter array along a direction perpendicular to the display panel at least partially overlap the fingerprint sensing unit.

Specifically, with reference to FIG. 1, wherein a size of the fingerprint sensing unit of the fingerprint recognition device is equal to or less than a size of a minimal pixel unit in the color filter array. In the color filter array, the red, green, and blue pixels are sequentially arranged according to a certain rule with three pixels arranged as a cycle unit. A transparent filter is dispose between adjacent cycle units. To have no influence to an entire arrangement of the filter array, a shape and an area of the transparent filter are equal to a shape and an area of a minimal pixel unit in the array. In other embodiment, the area of the transparent filter can be disposed based on requirements, and the size and shape of the transparent filter shall not be construes as limitations to the present invention.

Figure 4:
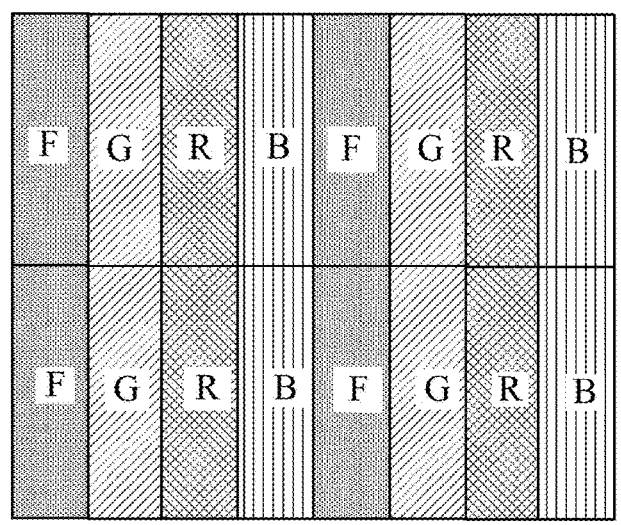
FIG. 4 is a possible position schematic view of a fingerprint recognition device of an embodiment of the present invention in the touch display panel in FIG. 3.

With reference to FIG. 4, FIG. 4 shows relationships of locations and sizes of the sensor and red, green and blue pixels of the touch display panel in FIG. 1. Reference character F refers to the fingerprint sensing unit of the fingerprint recognition device, reference characters G, R, B refer to green, red and blue pixels respectively. In the figure, the green, red and blue pixels and transparent filter are sequentially arranged, and a maximum size and a minimum size of pixel units of the transparent filter are equal. A maximum size and a minimum size of pixel units of the fingerprint sensing unit of the fingerprint recognition device are equal, and a location of the fingerprint sensing unit overlap the transparent filter along a direction perpendicular to a surface of the display panel, such that a reflected light generated after the in-screen light after is reflected by fingerprint can pass through the transparent filter to be received by the fingerprint sensing unit.

FIG. 4 only illustratively shows possible relationships of locations and shapes between a transparent filter and fingerprint sensing unit. The reflected light can be received as long as they partially overlap each other in the direction perpendicular to the surface of the display Therefore, the locations and shapes of the transparent filter and the fingerprint sensing unit cannot be explained as limitations to the present invention.

Figure 5:
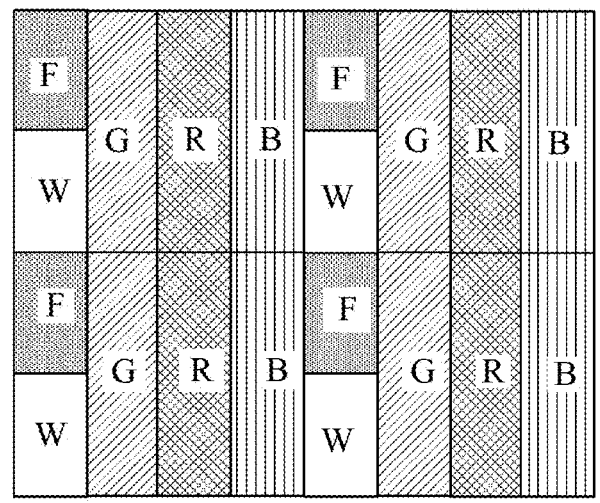
FIG. 5 is another possible position schematic view of a fingerprint recognition device of an embodiment of the present invention in the touch display panel in FIG. 3.

Preferably, projections of the transparent pixel units of the color filter array along a direction perpendicular to the display panel fully cover the fingerprint sensing unit, and an area of the projections is at least twice an area of the fingerprint sensing unit. In another embodiment of the present invention, an area of the transparent filter is greater than the area of the fingerprint sensing unit. With reference to FIG. 5, wherein the area of the fingerprint sensing unit is half the area of the transparent filter. Actually, because the fingerprint sensing unit is opaque, an application in FIG. 4 will results in great decrease of light transmittance of the display panel. The design in FIG. 5 aims at the above condition and optimizes the structures of the fingerprint recognition device. Specifically, the area of the fingerprint sensing unit is reduced, as shown in FIG. 5, a light transmission region W not blocked by the fingerprint sensing unit exists along a direction perpendicular to the surface of the display panel. Compared to FIG. 4, light transmittance of the display panel in the present embodiment has been improved greatly.

Compared to a conventional pressure sensing fingerprint recognition device, the fingerprint recognition device of the present invention achieves fingerprint recognition by a photosensitive module without employing additional sensing load, and prevents negative effect to touching functions. Furthermore, the present invention integrating the fingerprint recognition device into the transistor layer under the liquid crystal layer is a very mature technology in the art, and has simple processes and low cost. Therefore, the fingerprint recognition device of the present invention can be massively produced on a large scale based on existing processes, which achieves the goal of integrating the fingerprint recognition module into the displaying region of mobile apparatuses and extremely improves user's experience.

In one embodiment of the present invention, the touch display panel is an organic self-luminescence (OLED) display panel. The organic self-luminescence display panel comprises an upper-layer electrode, a self-luminescence layer, a lower-layer electrode, a fingerprint sensing unit and a control circuit fitted under the lower-layer electrode. The fingerprint sensing unit is configured to collect light entering the touch display panel and convert the collected light into electrical signals. The light is a reflected light generated from a screen light source blocked by a fingerprint. The control circuit is configured to, based on a matching algorithm, convert the electrical signals generated by the fingerprint sensing unit into image signals to generate a fingerprint image. The touch display panel further comprises a light concentrating unit located between the lower-layer electrode and the fingerprint sensing unit and configured to converge and enhance light entering the touch display panel.

Figure 6:
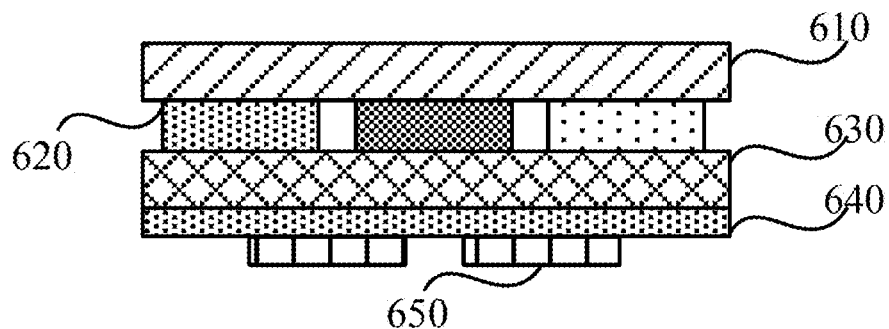
FIG. 6 is an illustrative structural schematic view of a fingerprint recognition device of another embodiment of the present invention.

Specifically, With reference to FIG. 6 that shows application of the fingerprint recognition device of the present invention in an OLED display panel. The OLED display panel comprises: an upper-layer electrode 610, a self-luminescence layer 620, and a lower-layer electrode 630. The upper-layer electrode 610 and the lower-layer electrode 630 are both made of transparent conductive material. The fingerprint recognition device of the present invention is disposed on a rear of the lower-layer electrode 630, i.e., a rear of a displaying surface of the display panel. Specifically, the light concentrating unit 640 of the fingerprint recognition device is adjacent to the lower-layer electrode 630, and the sensing unit 650 is located under the light concentrating unit 640.

Preferably, a self-luminescence layer of the organic self-luminescence display panel comprises a color filter array, the color filter array comprises red pixel units, green pixel units and blue pixel units. A distance between adjacent two of the red pixel units, the green pixel units and the blue pixel units is equal to or less than 10 µm. A projection of an interval between adjacent two of the red pixel units, the green pixel units and the blue pixel units of the color filter array along a direction perpendicular to the display panel is located at a geometric center of the fingerprint sensing unit.

In the present embodiment, the self-luminescence layer 630 is formed by a plurality of minimum pixel units arranged sequentially. The pixel units can comprise green pixel units, red pixel units, and blue pixel units. In application, an interval exists between adjacent pixel units, and an in-screen light, reflected by a fingerprint, can pass through the interval of the adjacent pixel units and irradiate the fingerprint recognition device. Therefore, with reference to FIG. 6, a location of the sensing unit 650 of the fingerprint recognition device corresponds to the intervals between adjacent light-emitting units in the organic self-luminescence display panel along a direction perpendicular to the display panel. Because a diameter of the interval is very small, according to the process known in the art, the interval is equal to or less than 10 µm, can is usually about 2-3 µm, therefore, a reflected light causes diffraction phenomenon when passing through the interval to form a comparatively large light spot on the sensing unit 650 of the fingerprint recognition device, which completes receiving the reflected light to accomplish fingerprint recognition.

The present invention entirely dismisses the conventional method of pressure sensing fingerprint recognition, employs an entire optical sensing method to realize fingerprint recognition. Compared to the prior art, advantages of the present invention are as follows.

1. The present invention integrates the fingerprint recognition device into the thin film transistor layer under the liquid crystal layer of the touch display panel and is able to achieve connection of the fingerprint recognition device to a controller without additional wires, which significantly improves integration, decreases manufacturing processes, and lowers manufacturing and designing cost.

2. the fingerprint recognition device of the present invention achieves fingerprint recognition by a photosensitive module without employing additional sensing load, prevents negative effect to touching functions, and optimizes performance of the touch display panel.

3. The present invention integrating the fingerprint recognition device into the transistor layer under the liquid crystal layer is a very mature technology in the art, and has simple processes and low cost. Therefore, the fingerprint recognition device of the present invention can be massively produced on a large scale based on existing processes.

4. By designing and optimizing the shape of the sensing unit of the fingerprint recognition device, fingerprint recognition can be realized without affecting the light transmittance of the display panel, and the goal of integrating the fingerprint recognition module into the displaying region on the mobile apparatus is realized, which improves the user experience.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

It is obvious for those skilled in the art that the present invention is not limited to the details of the above-described exemplary embodiments, and the present invention can be implemented in other specific forms without departing from the spirit or essential characteristics of the application. Therefore, the present embodiments are to be considered as illustrative and not restrictive. The scope of the invention is defined by the appended claims instead of being limited by the above descriptions. All changes in the meaning and scope of equivalent elements are included in this application. Any reference characters in the claims should not be construed as limiting the claim. In addition, it is to be understood that the word "comprising" does not exclude other elements or steps, and the singular does not exclude the plural. The plurality of units or devices recited in the system claims can also be implemented by one unit or device by software or hardware. Words "first", "second" are used to present names, and do not indicate any particular order.

What is claimed is:

1. A touch display panel with a fingerprint recognition device, wherein the touch display panel is a liquid crystal display panel, and the liquid crystal display panel comprises fingerprint sensing units and a control circuit that are integrated in a thin film transistor layer of the liquid crystal display panel;

wherein the fingerprint sensing units are configured to collect light entering the touch display panel and convert the collected light into electrical signals; the light is reflected light generated from a screen light source blocked by a fingerprint;

wherein the control circuit is configured to, based on a matching algorithm, convert the electrical signals generated by the fingerprint sensing units into image signals to generate a fingerprint image;

wherein each fingerprint sensing unit comprises a photosensitive material layer, the photosensitive material layer is configured to recognize light reflected from a fingerprint valley region and light reflected from a fingerprint ridge region and convert the lights into different current signals;

wherein a color filter array of the liquid crystal display panel comprises red pixel units, green pixel units, blue pixel units and transparent pixel units, and a shape and an area of each of the transparent pixel units are the same as a shape and an area of each of the red pixel units, the green pixel units or the blue pixel units; and wherein projections of the transparent pixel units of the color filter array along a direction perpendicular to the display panel fully cover the fingerprint sensing units, and an area of the projection of each transparent pixel unit is twice an area of each fingerprint sensing unit.

2. A touch display panel with a fingerprint recognition device, wherein the touch display panel is a liquid crystal display panel, and the liquid crystal display panel comprises fingerprint sensing units and a control circuit that are integrated in a thin film transistor layer of the liquid crystal display panel;

wherein the fingerprint sensing units are configured to collect a light entering the touch display panel and convert the collected light into electrical signals; the light is a reflected light generated from a screen light source blocked by a fingerprint;

wherein the control circuit is configured to, based on a matching algorithm, convert the electrical signals generated by the fingerprint sensing unit into image signals to generate a fingerprint image;

wherein a color filter array of the liquid crystal display panel comprises red pixel units, green pixel units, blue pixel units and transparent pixel units, and a shape and an area of each of the transparent pixel units are the same as a shape and an area of each of the red pixel units, the green pixel units or the blue pixel units; and wherein projections of the transparent pixel units of the color filter array along a direction perpendicular to the display panel fully cover the fingerprint sensing units, and an area of the projection of each transparent pixel unit is twice an area of each fingerprint sensing unit.

3. The touch display panel as claimed in claim 2, wherein the fingerprint sensing unit comprises a photosensitive material layer, the photosensitive material layer is configured to recognize a light reflected from a fingerprint valley region and a light reflected from a fingerprint ridge region and convert the lights into different current signals.

* * * * *